United States Patent

Davis

[19]

[11] Patent Number: 6,164,380

[45] Date of Patent: *Dec. 26, 2000

[54] METHOD FOR CLEARING DEBRIS IN A BORE

[75] Inventor: Lloyd Keith Davis, Stevenville, Tex.

[73] Assignee: Forta Corporation, Grove City, Pa.

[*] Notice: This patent is subject to a terminal disclaimer.

[21] Appl. No.: 09/298,641

[22] Filed: Apr. 23, 1999

Related U.S. Application Data

[63] Continuation-in-part of application No. 08/821,193, Mar. 17, 1997.

[51] Int. Cl.$^7$ ..................................................... E21B 37/00
[52] U.S. Cl. .............................................................. 166/312
[58] Field of Search ................................. 166/304, 305.1, 166/312, 376

[56] References Cited

U.S. PATENT DOCUMENTS

| | | |
|---|---|---|
| 2,727,001 | 12/1955 | Rowe . |
| 3,025,234 | 3/1962 | Canterino . |
| 3,284,353 | 11/1966 | Batdorf et al. . |
| 3,336,269 | 8/1967 | Monagle et al. . |
| 3,660,183 | 5/1972 | Knowles et al. . |
| 3,816,308 | 6/1974 | LeBlanc . |
| 3,993,133 | 11/1976 | Clampitt . |
| 4,216,836 | 8/1980 | Rayborn . |
| 4,456,061 | 6/1984 | Swift, Jr. et al. . |
| 4,490,261 | 12/1984 | Heilweil . |
| 4,498,994 | 2/1985 | Heilweil . |
| 4,579,668 | 4/1986 | Messenger . |
| 4,609,476 | 9/1986 | Heilweil . |
| 4,619,773 | 10/1986 | Heilweil et al. . |
| 4,726,906 | 2/1988 | Chen et al. . |
| 4,830,765 | 5/1989 | Perricone et al. . |
| 4,872,994 | 10/1989 | Jakob ........................................ 166/265 |
| 5,004,553 | 4/1991 | House et al. . |
| 5,034,139 | 7/1991 | Reid et al. . |
| 5,087,611 | 2/1992 | Forrest . |
| 5,118,664 | 6/1992 | Burts, Jr. . |
| 5,215,151 | 6/1993 | Smith et al. . |
| 5,284,207 | 2/1994 | Bittleston et al. . |
| 5,330,005 | 7/1994 | Card et al. . |
| 5,363,928 | 11/1994 | Wittliff . |
| 5,377,760 | 1/1995 | Merrill . |
| 5,431,237 | 7/1995 | Wittliff . |
| 5,439,058 | 8/1995 | Malbrel et al. . |
| 5,501,275 | 3/1996 | Card et al. . |
| 5,547,925 | 8/1996 | Duncan, Jr. . |
| 6,016,872 | 1/2000 | Davis ........................................ 166/312 |

FOREIGN PATENT DOCUMENTS 01272687 10/1989 Japan .

*Primary Examiner*—William Neuder
*Attorney, Agent, or Firm*—Kirkpatrick & Lockhart LLP

[57] ABSTRACT

The present invention provides a method for cleaning debris from a bore and includes injecting hydrophilic fibers selected from the group consisting of polyolefins, polyesters and nylons, suspended or dispersed in a water based or oil based liquid into the bore and forcing the suspension through the length of the bore, to its open end. In particular, the suspension is directed through sections of the bore holding quantities of debris formed from the drilling operation. The suspension loosens the debris and sweeps substantial quantities of debris from the bore, and acts to suspend the debris in the liquid in static suspension at times when the liquid is not being forced through the bore.

32 Claims, 2 Drawing Sheets

METHOD FOR CLEARING DEBRIS IN A BORE

CROSS REFERENCE TO RELATED APPLICATIONS

This application is a continuation-in-part of patent application Ser. No. 08/821,193, filed Mar. 17, 1997.

STATEMENT REGARDING FEDERALLY SPONSORED RESEARCH AND DEVELOPMENT

Not Applicable

BACKGROUND OF THE INVENTION

1. Field of the Invention

The present invention relates to a method for clearing debris in a bore, and more particularly, to the use of a liquid suspension containing hydrophilic fibers to sweep debris from the bore, as well as suspend debris left in the bore.

2. Description of the Background of the Invention

Subterranean wells, such as oil and gas wells and passages for running utility lines and conduit, such as gas, sewage, water, electrical, and cable lines are made by drilling a bore into the ground. As the rotating drill works its way through the geological formations, the drill becomes hot and debris from the cuttings, such as rock, dirt and clay, accumulates, filling the hole. To cool and lubricate the drill and remove the build up of drill cuttings from the bore, various methods have been used. Typically, fresh water, salt water, or a water/oil mixture is used to flush the cuttings from the well-bore and to cool the drill. However, the liquid alone does not remove enough of the unwanted material. To improve the levels of removal, additives are injected with the liquid through the drill pipe into the bore. The liquid is forced through the annulus created between the drill pipe and the wall of the bore to carry the debris out of the bore and simultaneously to cool and lubricate the drill.

A variety of additives have been used with drilling liquids. Viscosifiers, such as bentonite clay, Fullers' earth (attipigulite clay) and polyacrylamide polymer are dissolved in the liquid to increase its viscosity. Other materials, such as asbestos fibers have been dispersed in the liquid. The latter group of additives do not dissolve. Some of these additives have been observed to work well in fresh water but do not work well, or at all, in salt water.

Another reason to include additives is to prevent fluid loss through fissures and pores in the geologic formations. Significant amounts of liquid injected into the bore can be lost through porous rock or open channels in the formations. Additives sometimes function to stem the loss of circulation fluid by sealing the porosity and channel openings of the formations.

The addition of these materials increases liquid viscosity but slows the penetration of the drill through the earth. Slower penetration leads to increased operation time, higher energy costs, increased use of liquid and increased use of additives for the additional liquid.

There is a need for a method of clearing unwanted cuttings in bores which will not retard penetration of the drill and will not result in increased time and energy costs. There is a further need for a method which works to remove cuttings whether the liquid used is fresh or salt water, or oil based.

SUMMARY OF THE INVENTION

The present invention provides an improved method for clearing loose material, such as drill cuttings, in a bore. In one embodiment, the method includes injecting under pressure a liquid suspension into a conduit inserted into the bore wherein the conduit and the bore define an annulus therebetween, and thereby direct the liquid suspension to the materials to suspend at least a portion of the materials in the liquid suspension. In a bore wherein one end of the bore is open and the other end is remote from the open end, another embodiment of the invention includes cleaning the material from the bore, comprising directing a liquid suspension into the bore to a location between the remote end of the bore and the material to be removed and causing the liquid suspension to move toward the open end of the bore, thereby carrying at least a portion of the material to the open end. The method of the present invention relies on the improved liquid suspension which enhances the carrying capacity of the drilling liquid without increasing the viscosity of the liquid. The liquid suspension includes a liquid and a plurality of hydrophilic fibers dispersed within the liquid. Examples of suitable fibers may be selected from the group consisting of the polyolefins, such as polypropylene and polyethylene, nylon and polyester. The most preferred fiber is a polypropylene coated with a hydrophilic surfactant. More specifically, one method of the present invention includes injecting under pressure a liquid suspension into a conduit positioned in the bore wherein the conduit and the bore define an annulus between them. The method further includes sweeping loose material from the annulus by directing the liquid suspension through the annulus to the materials and to the open end of the bore. The liquid suspension carries major amounts of loose material contained within the annulus to the open end of the bore. The suspension and the material it carries is then preferably directed to a settling tank. Alternatively, it is directed to a series of screens wherein the material and fibers are removed from the liquid by agitation and filtration. The liquid is preferably recycled back for further use in the drilling and/or clearing operation.

BRIEF DESCRIPTION OF THE DRAWINGS

The characteristics and advantages of the present invention may be better understood by reference to the accompanying drawings, wherein like reference numerals designate like elements and in which.

DETAILED DESCRIPTION OF THE PREFERRED EMBODIMENTS

Figure 1:
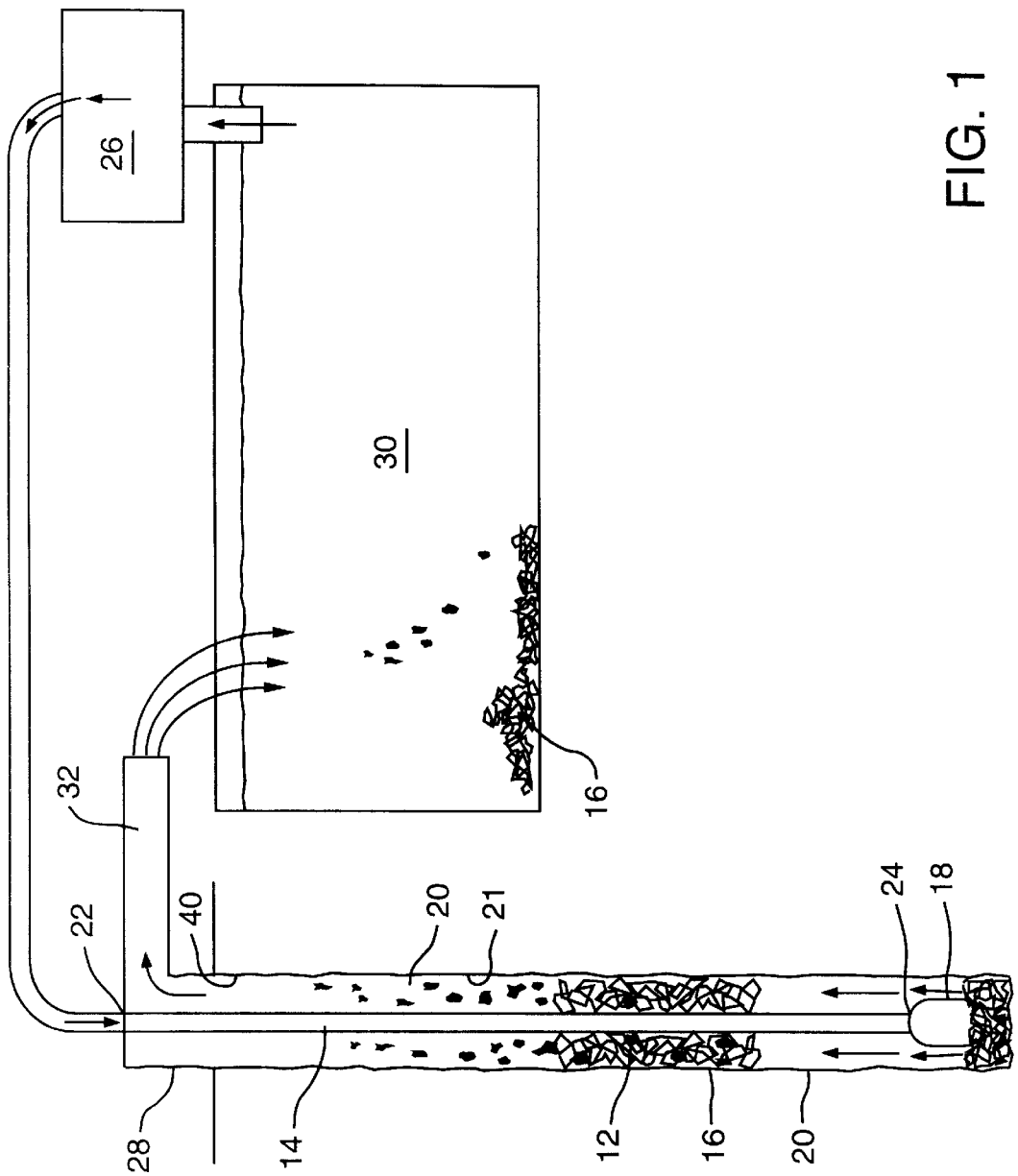
FIG. 1 provides a schematic section view of a well-bore sweeping operation as one form of the present invention.

It is to be understood that the figures and descriptions of the present invention have been simplified to illustrate elements that are relevant for a clear understanding of the present invention, while eliminating, for purposes of clarity, other elements. Those of ordinary skill in the art will recognize that associated equipment and other items may be employed in the implementation of the present invention. However, because such associated equipment and items are well known in the art, and because they are not necessary for a complete understanding of the present invention, they will not be discussed herein.

Also, the invention and devices to which the invention may be attached or with which it may be practiced may be described herein in the normal operating position, and terms such as top, bottom, upper, lower, front, back, horizontal, vertical, proximal, distal, etc., may be used with reference to only one operating position of the referenced device or element. It is to be understood, however, that this description is only illustrative of one form of the invention, and that the apparatus and method of the present invention may be manufactured, stored, transported, used, and sold in orientations other than those described.

In the present detailed description of the invention, particular emphasis is placed on one form of the invention as a well-bore drilling system, for drilling bores for oil, gas, or other subterranean wells, typically considered to be oriented substantially vertical to the ground surface. It should be understood, however, that the invention is not limited to embodiment in such form and may have application in whatever angled orientation of bore is desired. Accordingly, all non-vertical bore orientations relative to the ground surface are also contemplated by the present invention. For example, as will be more fully discussed, one of ordinary skill in the art will appreciate that the method of the present invention may be used to clear substantially horizontal subterranean bores that are, typically, oriented parallel to the ground surface, for receiving, for example, gas, water, telephone, electrical, sewage, cable, or other utility lines. It is contemplated that the phrase "oriented parallel to the ground surface" as used herein includes bore orientations having some inclination, curvature or angulation along the length of the bore. Thus, while the present invention is capable of embodiment in many different forms, this detailed description and the accompanying drawings disclose only specific forms as examples to the invention. Those having ordinary skill in the relevant art may be able to adapt the invention to application in other forms not specifically presented herein based upon the present description.

Furthermore, in the present detailed description of the invention, particular emphasis is placed on a method of forcing liquid suspension through the bore, typically by a pumping operation, to remove debris therein. One skilled in the art will appreciate, however, that for debris not removed from the bore, the liquid suspension of the present invention also acts to maintain at least a portion of this material in static suspension. This may occur, for instance, when the pumping operation is suspended or interrupted.

The drilled material will be described herein as "debris", "unwanted material", or "cuttings" as this type of material is typically removed from bores during drilling operations. One of ordinary skill in the art will appreciate, however, that the present invention may be employed in mining operations where some or all of the material may have some recovery value once removed from the bore and will not, therefore, be "unwanted" for all purposes.

The present invention includes injecting hydrophilic fibers suspended or dispersed in a liquid into a bore to clear the bore of loose materials. The liquid suspension may then be forced through the length of the bore, to its open end. In particular, the suspension is directed through sections of the bore holding quantities of debris formed from the drilling operation. The suspension loosens the debris and sweeps substantial quantities of debris from the bore without increasing the viscosity of the drilling liquid and thereby slowing the drill.

Referring to FIG. 1, there is shown schematically those aspects of a typical well-bore and drilling system pertinent to one method of the present invention. A bore 12 is drilled into a formation by means of any suitable known drilling equipment, including a drill pipe 14 and accompanying drill bit 18. For purposes of the present invention, the drill pipe 14 is a hollow conduit through which a liquid may pass. An annulus 20 is defined between the exterior of the drill pipe 14 and the wall 21 of the bore 12. A settling tank 30 is fluidly connected to a suction pump 26 which in turn is fluidly connected to the hollow interior of the drill pipe 14. A liner 40 may be inserted into the bore 12 to maintain its integrity. The liner 40 preferably has a cap 28 and outlet conduit 32 which empties into the settling tank 30. Debris 16, such as rock, dirt and clay, is created by the drilling. To remove the debris, the method of the present invention directs the liquid fiber suspension from the settling tank 30, through the drill pipe 14 and through the annulus 20 where the suspension contacts the debris and carries it to the surface of the well-bore 12 to outlet conduit 32. The suspension thereby sweeps the debris from the well-bore 12 as it is forced through the annulus 20.

The fibers used in liquid suspension of the method of the present invention are preferably wetable in various liquids, particularly in fresh water, salt water, water based drilling fluids and in oil based drilling liquids. Moreover, unlike the conventional additives heretofore used, the preferred fibers disperse in each of the foregoing liquids to create a homogenous matrix of suspended fibers which will suspend or reduce the velocity of settling solids in static conditions but which will behave like a fluid when pumped or agitated. In this regard the suspension exhibits excellent thixotropic properties.

The fibers are hydrophilic fibers selected from the group consisting of polyolefins, polyester and nylon. The preferred fibers are the polyolefins, polypropylene and polyethylene, and the most preferred is polypropylene. Preferably, from 0.1 to 6 lbs. of fibers, and more preferably 0.25 to 2 lbs. of fibers, are used per 42 gallon barrel of liquid. Recent trials and activity have shown a preference for a fiber concentration of 1 pound per 42 gallon barrel, or 15 pounds of fiber in a standard 15 barrel sweep. In extreme or difficult situations, it has been found that 30 pounds of fiber in a 30 barrel sweep provide more sweep abilities. Variation in the concentration can be tolerated, as any effective amount of fiber may be used. For example, for non-vertical bores, which will be discussed, tests have shown that 0.1 lbs. of fibers per 100 gallons of liquid effectively cleans the bore.

The fibers are most preferably comprised of a plurality of filaments processed in a tow form in bundles or in strips, from about one to two hundred, and preferably from two to six denier per filament (dpf), and most preferably from three to four denier. Alternatively, the fibers may be formed from fibrillated fibers, wherein the fibers are formed in interconnected networks. In yet another embodiment, the fibers may be a plurality of nonbundled monofilaments. The fiber strips may be any length that is dispersible and pumpable, but are preferably cut in lengths of from about three or four millimeters to 25 millimeters. Lengths between about 10 and 15 millimeters are more preferred and lengths of 12.5 millimeters are most preferred. The fibers may be naturally hydrophilic or may be coated with a hydrophilic coating, such as a surfactant. In addition to external surface treatment, one skilled in the art would appreciate that it is also possible to create hydrophilic properties by internal methods. This could be accomplished, for example, by way of chemical and polymer grafting. The attachment of graft coatings is accomplished by forming a covalent bond between the substrate and the monomers via the graft initiator. As a result, when compared to conventional coatings much thinner coatings can be obtained while providing good strength and adhesion properties of the material. The chemical reaction that takes place provides subsurface penetration and chemical bonding. Coating thickness can be adjusted according to specification. Other internal methods, such as, for example, co-polymer extrusion and the addition of additives during the extrusion process also may be employed to achieve desired hydrophilic properties. For example, a simple additive designed to create ultra-violet stability in a raw material may also cause the end result to be hydrophilic. Examples of suitable fibers include polypropylene, polyethylene, nylon and polyester. The most preferred fiber is a polypropylene coated with a hydrophilic surfactant.

A series of tests were performed to evaluate various synthetic fibers for their suitability for use in the method of the present invention.

Experiment 1

Each of the following fibers were tested: polypropylene fibers treated with a hydrophilic surfactant; nylon; polyethylene treated with a hydrophilic surfactant; and polyester. The nylon and polyester are naturally hydrophilic. All fibers were 5 mm, 3 denier.

Two grams of each kind of fiber was stirred into a different one of each of the following liquids and allowed to sit for one hour: 350 ml tap water; 350 ml salt water; 350 ml drilling fluid comprised of tap water and 15 grams of bentonite clay; and, 350 ml diesel oil.

In all sixteen samples, all of the fibers were observed to be easily wetted, to disperse with minimal agitation and to remain suspended. In addition, the liquid-fiber mixtures behaved like free flowing fluids when stirred or poured.

Experiment 2

Experiment 1 was repeated using 4 grams of each of the types of the fibers in 350 ml of each of the types of liquid. Each mixture was allowed to sit for one hour, as described in experiment 1. Then, steel shot having a diameter of 4.5 mm and weighing approximately 0.33 grams each were dropped onto the surface of each mixture. In all sixteen samples, the matrix created by the suspended fibers in liquid prevented the free fall of the shot. After a period of 24 hours, the shot remained suspended in each sample. When the mixtures were stirred or poured, each mixture behaved as a free flowing liquid.

Experiment 3

Experiment 1 was repeated using 6 grams of each of the types of fiber in 350 ml of each of the types of liquid. After the mixture sat for one hour, half inch glass marbles weighing approximately 3.5 grams each were dropped onto the surface of each mixture. All mixtures stopped the fall of the marbles and suspended the marbles for the entire 24 hour test period. All samples behaved like free flowing liquids when stirred or poured.

The foregoing experiments demonstrate that the liquid suspension used in the method of the present invention is useful in water based as well as oil based liquids and in fresh water as well as salt water. Further, the foregoing experiments demonstrate that relatively small concentrations of fiber will support relatively large weights of debris for extended periods and further that the suspension will flow freely like a liquid. The latter observation is important as evidence of the improved capability of the liquid suspension of the present invention to hold debris for removal without an increase in viscosity sufficient to retard the penetration of the drill through the formation, a problem regularly encountered with many conventional drilling fluid additives.

In other experiments it has been determined that hydrophobic fibers do not adequately sweep the debris from the well-bore. Only hydrophilic fibers may be used. However, the hydrophilic character of the fiber may be inherent in the material itself, it may be attributed to the extrusion process in which the fibers are made, or it may be due to the addition of a hydrophilic coating, such as a hydrophilic surfactant. Any suitable known hydrophilic coating will suffice. In addition, chemical and polymer grafting, co-polymer extrusion, the addition of additives during the extrusion process, or other internal hydrophilic methods may be employed to achieve the desired properties and characteristics.

In use, the suspension is premixed, perhaps in the settling tank 30. Fibers cut into lengths up to 25 mm, and preferably from 4 mm to 15 mm, and more preferably from 10 mm to 13 mm are added to the desired liquid and stirred to evenly disperse the fibers throughout the liquid. From 0.1 to about 6 pounds of fiber are added for each barrel of liquid, with good results being achieved with 0.1, 0.25, 0.5, and one pound applications per barrel. Each barrel holds about 42 gallons.

In the preferred embodiment of the debris removal method, a liquid suspension comprised of 5 mm 3 denier strips of polypropylene fibers coated with a hydrophilic surfactant suspended in either a water based or an oil based liquid in a concentration of about 2 lbs. of fibers for each 42 gallons of liquid are pumped from tank 30 by means of pump 26 into the top end 22 of the drilling pipe 14 and forced to the bottom end 24 of the drilling pipe 14 past the drill bit 18 into a remote end of the well-bore 12. The suspension enters the annulus 20 defined between the wall 21 of the well-bore 12 and the exterior of the drilling pipe 14. The annulus 20 will contain the drill cuttings—rock, dirt, clay and similar debris—from the drilling operation. The continuing flow of liquid suspension being pumped into the well-bore 12 through the drilling pipe 14 forces the suspension from the remote end towards the open end of the well-bore 12. The suspension carries the debris with it to the open end at cap 28 and to the outlet conduit 32 for delivery back to the settling tank 30. Alternatively, the outlet 32 may lead to a series of troughs (not shown) having screened bottoms and equipped with agitation mechanisms for filtering the liquid from the solids removed from the well-bore 12. Debris remaining in the bore is held in suspension so as not to retard the drilling operation. This is also the case when pumping operations are suspended or interrupted.

In experiments done in plexiglass u-tubes to permit visualization of the flow of the suspension and movement of solids placed in the u-tube, the liquid-polypropylene fiber suspension was observed to form a matrix in which the solids were suspended and carried to the open end at the surface. It is believed that the individual fibrils that make up the fibers open and disperse throughout the liquid to form the matrix which binds up the solids in the annulus.

In field studies of the method of the invention, significant quantities of debris from drill cuttings were carried to the surface with the flow of the liquid-fiber suspension. Furthermore, the field observations showed that the addition of the suspension to the well-bore did not slow the rate of the drill's penetration through the formation. This is believed to be due to the fact that the suspension behaves like a free flowing liquid and does not appear to increase the viscosity of the drilling fluid.

Figure 2:
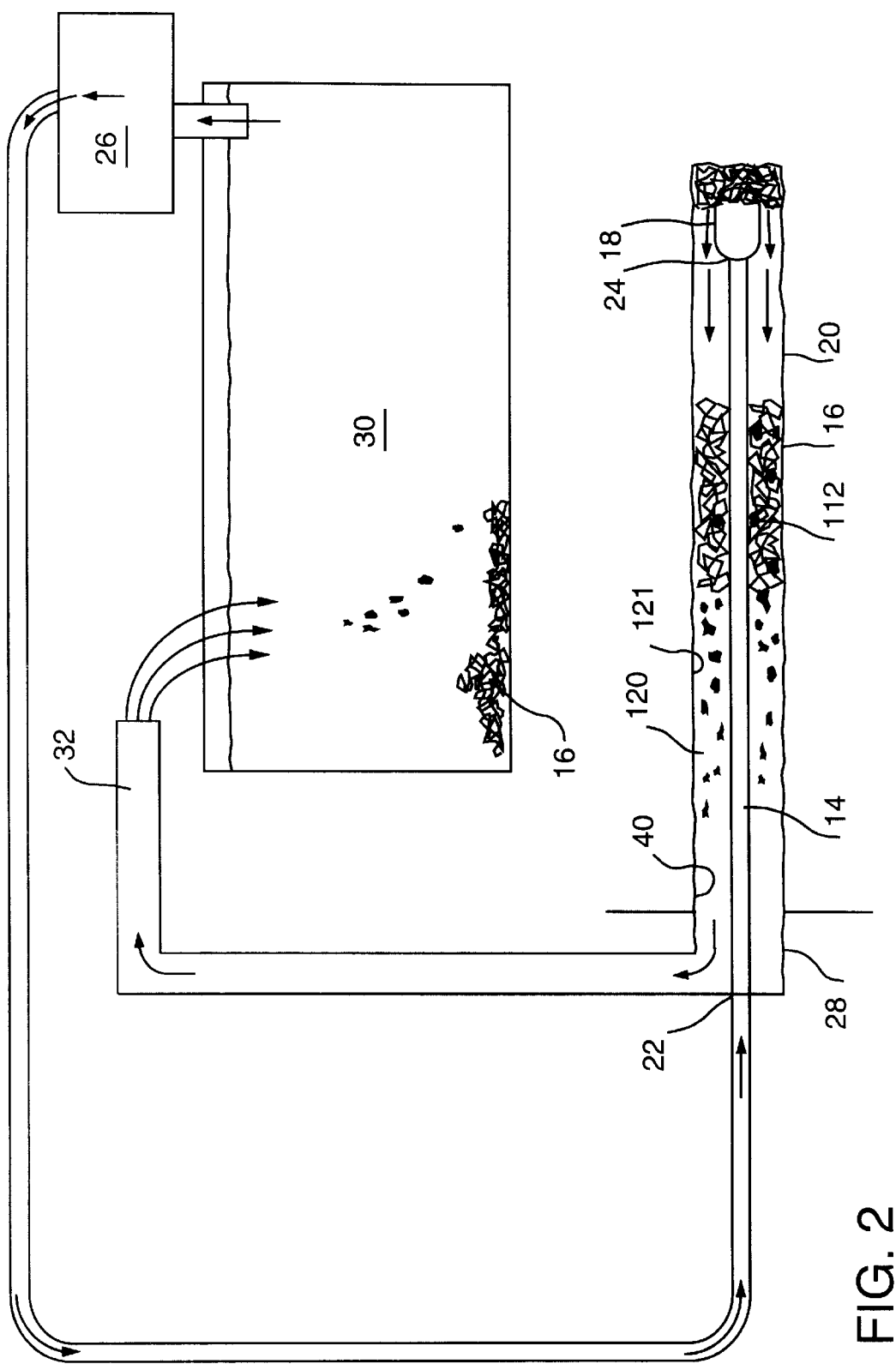
FIG. 2 provides a schematic section view of a bore sweeping operation as another form of the present invention.

FIG. 2 illustrates a second drilling system pertinent to another method of the present invention. Unless specifically provided for herein, the equipment components, their operation, and the method used for drilling are the same as described in the previous embodiment. This embodiment is directed to drilling systems that are employed to drill substantially horizontal subterranean bores that are oriented parallel to the ground surface. Examples or such drilling systems are those that are used for laying, for example, gas, water, telephone, electrical, sewage, cable, or other utility lines. The drilling system in this embodiment is oriented such that the bore 112 and associated wall 121 and annulus 120 are horizontally formed, substantially parallel to the ground surface.

It should be understood that generally horizontal bores, such as those disclosed in FIG. 2, and bores for running certain utility lines will typically require a smaller portion of the drilled cuttings to be removed from the bore when compared to vertical bore systems (such as disclosed in the first embodiment, FIG. 1) or well bores for oil or gas production. This is so because material loosened when drilling generally horizontal bores falls to the sides of the bore and does not usually fall to the remote end of the bore where the cuttings can interfere with the drill bit during the drilling process. Where it is not necessary to draw resources from the bore, and only space of sufficient size to lay utility lines is needed (and not to recover all or substantially all of the drilled material such as, for example, in mining), only that portion of the debris 16 that would otherwise hinder the drilling process or interfere with the utility lines and conduit or pipes need be removed from the annulus 120. In this regard, for non-vertical bores the amount of fiber per gallon of liquid necessary to clean the bore may be less than that needed for vertical bores. Although any effective amount of fiber may be used for non-vertical bores, a range of 0.1 to 0.6 lbs. of fiber per 100 gallons of liquid is preferred, and a range of 0.25 to 2 lb. of fiber per 100 gallons of liquid is more preferred.

It should be understood, however, that the drilling systems hereinbefore described and shown in FIGS. 1 and 2 are illustrative only, as the invention is not limited to use with vertically or horizontally disposed bores. The invention has application in whatever angled orientation of bore is desired.

A series of tests were performed to evaluate the method of the present invention in various drilling operations.

Experiment 4

On numerous bores in Dallas, Tex., delays are frequently encountered due to interference with the movement of the drilling fluid through the bore from the accumulation of cuttings between the bit and the entry end of the bore where the drilling rig is located. When liquid is pumped in and the annulus is plugged up with debris, the liquid forces its way through some other path to the surface, such as through a fissure or crack in the formation or through animal tunnels in the ground. The drill stem must be backed out of the bore and the bore must be cleared in order to regain circulation. A series of bores ranging from 600–1200 feet were drilled using as a drilling fluid, a high yield bentonite mud having viscosities ranging from 60–200 seconds as measured in a standard Marsh funnel. As used herein, all viscosity measurements are based on the time in seconds it takes 1000 cc of the particular fluid being measured to flow through the Marsh funnel. Marsh funnels are designed primarily for use in oil fields, but its use as a viscosity measurement tool herein is not limited to oil field drilling applications. A March funnel has a diameter of 3/16 inches. The viscosity of water in a Marsh funnel is 28 seconds. In all of these bores, stoppage due to liquid diversion from the bore due to interference with accumulations of cuttings occurred within the first 300 feet. Tests were conducted to determine whether such stoppages could be prevented by utilizing the method of the present invention to improve hole cleaning with a lower viscosity mud. The equipment employed in this test included a 3 inch drill stem, a 3½ inch mud motor, a 5⅞ inch bit, a 110 gpm pump, and a 2000 gallon pit. The soil conditions present were a mixture of hard gray shale and blue clay. The viscosity of the drilling fluid was raised to a 45 second viscosity with high yield bentonite (i.e., 1000 cc of the clay and water mixture took 45 seconds to flow through the Marsh tunnel). Approximately 4.5 pounds of the fiber of the present invention were mixed through the mud hopper and dispersed throughout the 2000 gallon mud volume prior to spud. Because some of the fiber of the present invention was removed from the mud system by the shaker, about two thirds pound of the fiber was added to the mud for each 30 feet drilled. Test results indicated that the bore was completed to 800 feet with no stoppages or reduction in returns. The volume of cuttings recovered from the bore far exceeded bores formed without using the present invention. Large amounts of blue clay were recovered that were not seen in previous bore cleaning operations. Improved penetration rate and reduced mud cost were also observed. Accordingly, the use of small amounts of fiber reduced problems with drill stoppages by improving hole cleaning. This allows the use of much lower viscosity muds, which, in turn, allows for lower annular pressures to reduce pressure induced fracturing.

Experiment 5

Test were run in order to determine whether or not use of the present invention would reduce or eliminate the loss of piping on those occasions when pipe is to be pulled out of a subterranean bore. Specifically, four 1½ inch pieces of poly-pipe were removed during pullback with a 10 inch reamer in a 1200 foot bore. When the pipe was pulled from the bore, there was approximately 300 feet of crushed pipe. Large slivers of shale were recovered with the product. It was presumed that the bore had been lost to heaving shale. The pilot hole was then reamed back with a 10 inch reamer. The objective of this test was to salvage the bore by stabilizing the shale and unloading shale from the bore. The equipment employed for this test included a 3 inch drill stem, an 8 inch spade bit, a 40 gpm (limited by small jets in the bit) pump, and a 2000 gallon pit. The soil conditions present were heaving shale. In preparation, the viscosity of the drilling fluid was raised to 40 seconds with PHPA, a partially hydrogenated polyacrylamide acrylate co-polymer, for hole stabilization. Approximately 4.5 pounds of the fiber of the present invention were added to produce the suspension for hole cleaning. As a result of this process, the spade bit was drawn back through the 1200 foot bore over a 4 hour period. The suspension carried large amounts of shale from the bore. Pieces of shale ranged from ¼–4 inches long. The fiber of the present invention was added at a rate of about one third pound for every 30 feet of stem washed over the four hour period. Pullback was completed with a 10 inch reamer over a seven hour period. Accordingly, the fiber of the present invention was able to clean large pieces of shale with a 40 second viscosity even with very low annular velocities of about 40 gpm.

Experiment 6

Tests were run to determine whether or not the method of the present invention may be used for removal of gravel pack from water wells. Following a decline in water production from 150 gpm to 50 gpm from an irrigation well in Erath County, Texas, it was determined that attempts should be made to restore the well production to the 150 gpm level. Three hundred eighty-five feet of 8 inch casing were pulled from the 12 inch hole. The hole was entered with a 6 inch bit and a 3½ inch drill pipe. The bottom was tagged at approximately 285 feet, indicating that the well was filled with approximately 100 feet of gravel. The gravel size ranged from ⅛–½ inches in diameter. High yield bentonite was mixed until the fluid system reached a 55 second viscosity. With a pump rate of approximately 170 gal/min the operator attempted to wash to the well bottom without employing the method of the present invention. After circulating for a period of time, the hole fill prevented the rig from making a pipe connection. Thereafter, one pound of the fiber of the present invention was mixed through the mud hopper into the mud system and circulated. Upon reaching the surface, a large amount of gravel was unloaded from the hole. The crew was able to make a connection with no fill. Following pipe connections, additional fiber was slowly added to the mud system resulting in a concentration of approximately ¼ pounds per 100 gallons of mud. The bit was advanced to the bottom of the well with no additional problems or additions to the mud system. The pipe was pulled out of the hole, and a 12 inch bit was installed and forced back through to the bottom of the hole. After reaching the bottom, the mud checked at a 48 second viscosity. The mud was then watered back to a 34 second viscosity, and the pipe was pulled out of the hole and casing was run to 385 feet with no hole fill. Total mud usage was 500 pounds of high yield bentonite and 5 pounds of fiber.

After gravel packing and completing the well, production was restored to 150 gpm. After a 15 minute pumping time, no detectable fiber could be screened from the water. As a result, small additions of fiber to the mud systems resulted in an efficient, effective, and greatly enhanced hole cleaning without increasing fluid viscosity. The method of the present invention provided improved hole cleaning, lower mud weight, lower mud solids, improved dropping of solids in settling pits, enhanced penetration rate, while reducing mud cost.

The method of the present invention provides a useful and much needed means of cleaning debris from a bore which may be used with a variety of drilling fluids and which will not retard the rate of penetration of the drill through the geologic formation.

In an alternative embodiment of the invention, the fibers described herein and a foaming agent are added to a drilling fluid. Compressed air is injected into the mixture to form a foam. The foam is used to clear a bore in those cases where there is no circulation liquid, typically when pneumatic drills or rotary drills are employed. The foaming agent is preferably a sodium laurel sulfonate but a variety of different surfactants or foaming agents may be used.

What is claimed is:

1. A method of cleaning loose materials from a bore, comprising:
   injecting under pressure a liquid suspension into a conduit inserted into the bore wherein the conduit and the bore define an annulus therebetween, the bore being oriented in a non-vertical position; and
   sweeping at least a portion of loose materials from the annulus by directing the liquid suspension through the annulus to the materials;
   wherein the liquid suspension comprises hydrophilic fibers selected from the group consisting of polyolefin, polyester and nylon, suspended in a liquid.

2. The method of claim 1 wherein the fibers are up to 25 mm in length.

3. The method of claim 1 wherein the fibers are from 10 mm to 15 mm in length.

4. The method of claim 1 wherein about 0.1 to 6.0 lb. of fiber are added per 42 gallons of liquid.

5. The method of claim 1 wherein about 0.25 to 2.0 lb. of fiber are added per 100 gallons of liquid.

6. The method of claim 1 wherein about ¼ lb. of fiber is added per 100 gallons of liquid.

7. The method of claim 1 wherein the fibers are polyolefin fibers selected from the group consisting of polyethylene and polypropylene.

8. The method of claim 7 wherein the fibers are polypropylene fibers coated with a hydrophilic surfactant.

9. The method of claim 1 wherein the hydrophilic fibers are grafted.

10. The method of claim 1 wherein the hydrophilic fibers include an additive designed to create ultra-violet stability.

11. The method of claim 1 wherein the hydrophilic fibers are formed by co-polymer extrusion.

12. In a bore having loose material present therein and having two ends wherein one end of the bore is open and the other end is remote from the open end, a method comprising:
    directing a liquid suspension into the bore to a location between the remote end of the bore and the material to be removed therefrom, the bore oriented parallel to a ground surface;
    causing the liquid suspension to move toward the open end of the bore past the material, thereby carrying at least a portion of the material to the open end; and
    directing at least a portion of the material containing suspension out of the bore;
    wherein the liquid suspension is comprised of a plurality of hydrophilic fibers suspended in a liquid, the fibers selected from the group consisting of polyolefin, polyester and nylon.

13. The method of claim 12 wherein the fibers are up to 25 mm in length.

14. The method of claim 12 wherein the fibers are from 10 mm to 15 mm in length.

15. The method of claim 12 wherein about 0.1 to 6.0 lb. of fiber are added per 42 gallons of liquid.

16. The method of claim 12 wherein about 0.25 to 2.0 lb. of fiber are added per 100 gallons of liquid.

17. The method of claim 12 wherein the fibers are polyolefin fibers selected from the group consisting of polyethylene and polypropylene.

18. The method of claim 17 wherein the fibers are polypropylene fibers coated with a hydrophilic surfactant.

19. The method of claim 12 wherein the hydrophilic fibers are grafted.

20. The method of claim 12 wherein the hydrophilic fibers include an additive designed to create ultra-violet stability.

21. The method of claim 12 wherein the hydrophilic fibers are formed by co-polymer extrusion.

22. A method for sweeping loose solids material from a bore, comprising:
    pumping a suspension of hydrophilic polyolefin fibers into a conduit positioned in the bore, the conduit extending from an open end to a remote end of the bore and defining an annulus between the conduit and the bore, the bore oriented parallel to a ground surface; and
    directing the suspension to the remote end of the bore, then through the annulus to the open end of the bore such that the material carries at least a portion of the material contained within the annulus to the open end of the bore.

23. The method of claim 22 wherein the fibers are a length up to 25 mm.

24. The method of claim 22 wherein the fibers are from 10 mm to 15 mm in length.

25. The method of claim 22 wherein about 0.1 to 2.0 lb. of fiber are added per 100 gallons of liquid.

26. The method of claim 22 wherein the fibers are polypropylene fibers coated with a hydrophilic surfactant.

27. The method of claim 22 wherein the hydrophilic fibers are grafted.

28. The method of claim 22 wherein the hydrophilic fibers include an additive designed to create ultra-violet stability.

29. The method of claim 22 wherein the hydrophilic fibers are formed by co-polymer extrusion.

30. The method of claim 23 wherein the suspension is comprised of the fibers, a foaming agent, a liquid and compressed air to form a foam.

31. A method of suspending loose materials in a bore, comprising:
   injecting under pressure a liquid suspension into a conduit inserted into the bore wherein the conduit and the bore define an annulus therebetween; and
   directing the liquid suspension to the materials to suspend at least a portion of the materials in the liquid suspension;
   wherein the liquid suspension comprises hydrophilic fibers selected from the group consisting of polyolefin, polyester and nylon, suspended in a liquid.

32. The method of claim 31 further comprising sweeping at least a portion of the loose materials from the annulus by directing the liquid suspension through the annulus to the materials.

* * * * *